United States Patent Office 3,247,140
Patented Apr. 19, 1966

3,247,140
VINYL HALIDE POLYMERS CROSS-LINKED WITH IMIDAZOLINE-BENTONITE REACTION PRODUCTS
Philip K. Isaacs, Brookline, and Elizabeth C. Dearborn, Boston, Mass., assignors to W. R. Grace & Co., Cambridge, Mass., a corporation of Connecticut
No Drawing. Filed Mar. 22, 1961, Ser. No. 97,422
23 Claims. (Cl. 260—23)

This invention relates to odorless, nonextractable curing agents and to thermosettable polymers containing such agents. In a particular aspect it relates to curing agents comprising dried bentonite clay and complex polyimidazolines and to halogenated polymers, such as polymers and copolymers of vinyl chloride, curable by such agents.

Polyvinyl chloride and vinyl chloride copolymerized with another polymerizable monomer are highly useful when dispersed in a nonvolatile plasticizer. These high molecular weight fluid compositions have a low viscosity and fuse on heating to yield rubber-like articles or rigid products when certain additives are incorporated therein. Paste grade polyvinyl chloride is generally preferred for these applications because it can be dispersed to a low viscosity without solvating in the solution. However, other grades of polyvinyl chloride and copolymers of vinyl chloride are widely used to obtain the same end products. These include extrusion grade polyvinyl chloride and vinyl chloride copolymerized with vinyl acetate, certain acrylates and maleates, and vinylidene chloride wherein the copolymer contains at least 50 percent of vinyl chloride. In any case, these polymeric materials are notably deficient because of their thermoplastic nature, their inability to resist specific solvents, the extractability of compounding ingredients, and they lack the necessary proclivity to adhere to many surfaces. While reactive plasticizers have been used to overcome certain of these deficiencies, it has been the practice to include active catalysts. Such inclusion either limits the ability of the compositions to remain fluid over a relatively long period of time or it introduces problems involving odor and toxicity.

It is, therefore, an object of this invention to provide a class of curing agents for halogenated polymers. Another object is to provide permanently fluid polymeric compositions which can be cured to infusible, inextractable products by a short heat cycle without the use of volatile, toxic or expensive catalysts. A further object is to provide heat-curable compositions having low nitrogen extraction, low taste and low odor levels which are suitable for use as gasketing materials in food jar caps.

These objectives are accomplished essentially by adding a compound comprising dried bentonite clay and a polyimdazoline to a suitable polymeric material. Other additives, such as plasticizer and filler, may be included therein depending upon the use to which the compositions are put and the processing methods which are employed. These polymeric compositions are fluid at room temperature but solidify to infusible and insoluble products when heated between about 140° C. to 210° C. for about 70 minutes to 1 minute.

Imidazolines are strong organic bases, highly reactive with a great number of reagents, and many, particularly the polyimidazolines, possess strong surface activity. Their use in cross-linking polyvinyl chloride and other halogenated polymers is described in copending United States patent application, Serial No. 61,810, filed on October 11, 1960, and now abandoned. The use of imidazolines and polyimidazolines alone in a polyvinyl halide system, however, places certain limits to which the resulting polymers may be applied. For example, the heat-induced cross-linking in the case of polyvinyl halide is frequently accompanied by darkening and degradation of the polymer when heating is carried out over a prolonged period, i.e., for 70 to 80 minutes at between about 140° C. to about 210° C. Another disadvantage is that while the imidazoline crosslinking agent is permanently grafted to the polymer during cure, it is partially extractable by water or acid after the curing cycle is completed. This extractability factor together with any unreacted imidazoline, which imparts a slight but characteristic odor, renders the cured product unsuitable for use in contact with food. Another objection is that the adhesive bonds which are formed with the imidazoline-polyvinyl halide combinations are invariably destroyed by water immersion.

The foregoing disadvantages which flow from the sole use of the imidazoline compounds may be overcome by introducing polyimidazolines together with dried bentonite clay in the polymeric system. In one embodiment of the invention, dried bentonite clay is mixed with a polyimidazoline which react at room temperature and above to give a polyimidazoline-bentonite complex. In another embodiment, undried bentonite may be mixed with the polyimidazoline and the mixture is then heated to drive off the surface water of the clay to give the same complex. A further embodiment involves the separate addition of dried bentonite and the polyimidazoline to the polymeric system. A preferred embodiment is to disperse a semisolid polyimidazoline and pre-dried bentonite in a plasticizer, such as epoxidized triglycerides of vegetable oil fatty acids. The resulting "mud" can be blended, for example, with dispersion grade polyvinyl chloride to give a smooth, fluid plastisol, or the "mud" can be incorporated in a milled sheet of polyvinyl chloride or other halogenated polymer. A preferred mode of operation is to dry the "mud" to a powder and then add the powder to a polymeric material. In practicing any of the foregoing embodiments, its is essential that the bentonite be in a dry state before it is introduced into the polymeric system.

The mechanism involved in this system is not completely understood but experimentation has provided a partial explanation. It is recognized that bentonite clay will adsorb and react with organic amines. In the presence of water, the amino groups, particularly amine salts, replace sodium ions on the surface of the clay to form ammonium bentonite salts and subsequent solvent or water treatment cannot remove all of the adsorbed amine. The amount of amine retained is related to the base exchange capacity of the clay.

If a polyimidazoline and bentonite clay are dispersed in water to form an aqueous slurry, the reaction is rapid and complete due to the strongly basic nature of the polyimidazoline. However, the product, when dried, is a powder which has no cross-linking action when added to a halogenated polymer. The commercial amine-bentonite complexes are likewise devoid of any such action, presumably because the amines are tightly bound to the clay surface.

It has now been discovered that if the bentonite clay is dried to remove its surface water before it is composited with the polyimidazoline, or if undried bentonite is mixed with the polyimidazoline in the absence of external additions of water and the mixture is heated to drive off the clay surface water before it is added to a polymeric material, the resulting bentonite-polyimidazoline complex serves as an excellent curing agent for halogenated polymers. This surface water must be removed else its presence in the polymeric system tends to promote salt formation with the polyimidazoline and consequently curing (cross-linking) of the polymer is reduced. In addition, the presence of surface water leads to formation of bubbles when the polymer is cured, which formation is objectionable in many applications. While the lattice water of bentonite is sufficient to form a tight complex with the polyimidazoline, its presence is unobjectionable because freedom is allowed to enough imidazoline groups to react with the polymeric material.

The surface water of the bentonite may be driven off by heating the clay alone or in admixture with the polyimidazoline to the boiling point of water and preferably between about 100° C. to 200° C. Heating is carried out for a sufficient period of time until the bentonite has attained a constant weight at the prescribed temperature range. Generally, such heating results in a loss of moisture ranging between about 5 to 10 percent depending on the initial moisture content of the raw bentonite. The heating period varies and this is dependent upon the thickness of the clay particles, the thin particles requiring less time while the thicker particles require a longer heating cycle. These variables with respect to particle thickness and amounts of surface water do not represent insurmountable obstacles respecting heating times and temperatures and the skilled artisan can quickly ascertain the heating conditions necessary to obtain a dried bentonite of constant weight by simply heat-treating a few specimens of a given quantity of raw bentonite. Accordingly, the terms "dried" and "pre-dried" bentonite as used herein refer to raw bentonite which has been heat-treated in accordance with the foregoing conditions until the bentonite has attained constant weight.

In addition to the excellent curing action of the complex bentonite-polyimidazoline compound, its incorporation in cured polymers gives products which are low in odor, have low extraction in water and acid, are possessed of excellent adhesive properties, and have a minimum tendency to degrade on prolonged heating. There is reason to believe that the cured products have a unique structure wherein the clay particles are actually chemically bound to the polymer as postulated below:

(3) The group

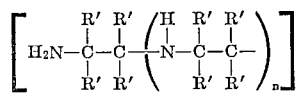

and homologues thereof where $n$ is a number from 0 to 5, and R′ may be hydrogen or a lower alkyl group such as methyl, ethyl, etc.; and R² may be
(1) Hydrogen; or
(2) An alkyl chain of not more than 36 carbon atoms; or
(3) An aliphatic ester group; or
(4) The group

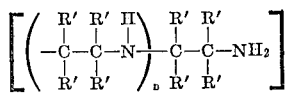

and homologues thereof where $n$ is a number from 0 to 5, and R′ may be hydrogen or a lower alkyl group such as methyl, ethyl, etc.; and
(5) Other 2-substituted-2-imidazoline or 1,2-disubstituted-2-imidazoline groups.

The above definition is intended to include as equivalents such compounds where either the 4 or 5 carbon atom or both are substituted with a lower alkyl group, such as methyl or ethyl.

The polyimidazolines may be prepared generally by contacting appropriate amounts of an alkylene diamine or polyalkylene polyamine and mono- and dicarboxylic acids under reactive conditions of temperature and pressure. Suitable amines include ethylene and propylene diamine, diethylene and dipropylene triamine, triethylene tetramine and tetraethylene pentamine. Representative monocarboxylic acids are acetic, caproic, pelargonic, lauric, palmitic, oleic and stearic acids. Typical dicarboxylic acids include dimerized fatty acids, adipic, pimelic, suberic, azelaic and sebacic acids. Generally,

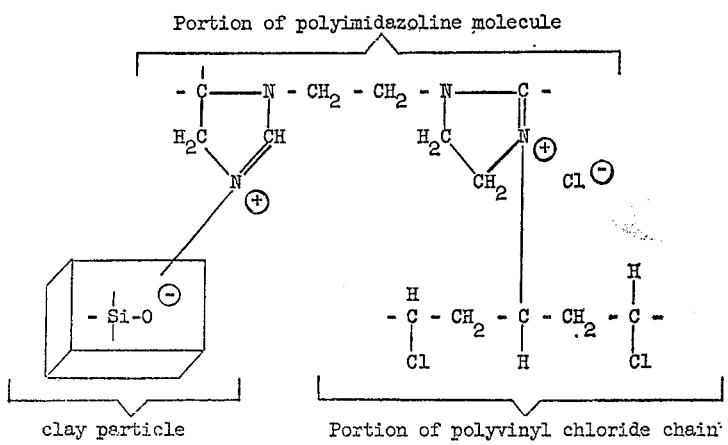

The clay which is operable in the practice of this invention is Wyoming bentonite. It is characterized by its high base-exchange capacity which is of the order of between about 80 and 90 milliequivalents per 100 grams of air dried clay wherein the base-exchange positions are occupied predominantly with sodium ions.

The polyimidazolines which are useful in this invention may be defined as 2-substituted-2-imidazoline or 1,2-disubstituted-2-imidazoline having the general structure:

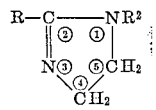

In the above, R may be
(1) Hydrogen; or
(2) An alkyl chain of 1 to 36 carbon atoms derived from a carboxylic acid; or the reaction between the polyamine and acid may be carried out at a temperature ranging between about 180° C. and 240° C. and a pressure between about .1 mm. and 50 mm. of Hg for a period of time sufficient to cause substantially complete consumption of the reactants.

The preferred polyimidazolines are those which in themselves are non-volatile and chemically stable at curing temperatures. In addition, they should be such that the uncured mixture with the polymeric material undergoes no change with time or is relatively unaffected by atmospheric moisture.

The amounts of polyimidazoline and clay which are used to prepare the complex are dependent upon the base-exchange capacity of the clay. In this respect, the exchange capacity must be equal to or greater than that required to react with the number of molecules of polyimidazoline present. Where a high molecular weight semi-solid polyimidazoline is used, a solvent, such as methylene chloride, may be added to fluidize the polyimidazoline. The solvent is later removed by evaporation before the complex is incorporated in the polymer.

In addition, plasticizers for polyvinyl chloride and vinyl chloride copolymers may be added to the complex or to the uncured polymeric mixture to the extent of about 20 to 60 percent by weight of the final composition. Representative plasticizers include dioctyl phthalate, dibutyl phthalate, tricresyl phosphate, dicapryl phthalate, dioctyl azelate, dioctyl adipate, esters of lower alkyl alcohols and fatty acids, and epoxidized triglycerides, such as epoxidized soybean oil and epoxidized castor oil.

For some applications it may be desirable to add certain metallic compounds to regulate the curing action of the polyimidazolines on the polymeric material. The class of operable compounds are the oxides, sulfides and salts of metals of Groups IIB and IVA of the periodic table of elements. The specific metals are zinc, cadmium, mercury, and lead and the operable compounds of these metals are limited to those which are soluble in ammonium salts or ammonia solutions and form ammonia complexes. The metallic compound is preferably employed in finely divided form so as to present maximum surface for reaction and a particle size of about .5 micron or less has been found effective. Representative compounds include ZnO, $ZnCrO_4$, $ZnSO_4$, CdO, CdS, HgCl, HgO, $PbCrO_4$, and $Pb_3O_4$, and they may be incorporated in amounts ranging between about .5 and 30, preferably 1 to 20 parts by weight of the final polymeric composition.

Other ingredients may be incorporated in the final composition to meet a wide variety of requirements. These include fillers, pigments and blowing agents, for example.

The invention is further illustrated by the following examples. To simplify the presentation, the polyimidazolines which were employed in the specific examples are designated as polyimidazolines I, II, III and IV. It is to be understood that the enumerated compounds are representative and not exhaustive of the numerous polyimidazolines which are operable in the practice of this invention.

POLYIMIDAZOLINE I

One mole of sebacic acid and two moles of oleic acid were reacted with two moles of triethylene tetramine. The reaction was carried out over a 4-hour period at 150° C. to 220° C. and at a pressure of 760 to 15 mm. Hg in a nitrogen atmosphere accompanied with vigorous agitation. The product was a mixture of imidazolines in which the following structure predominated:

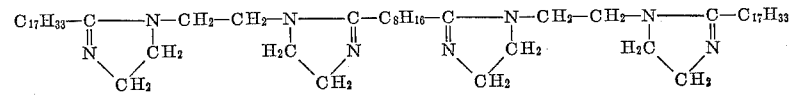

POLYIMIDAZOLINE II

It was prepared by vigorously agitating two moles of oleic acid, five moles of sebacic acid and six moles of triethylene tetramine. The reaction was carried out for 4 hours at 150° C. to 200° C. and a pressure of 760 to 15 mm. Hg in an atmosphere of nitrogen. The yield comprised a mixture of products in which the following structure was predominant:

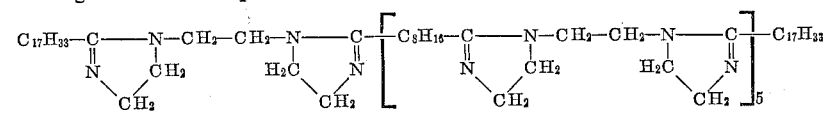

POLYIMIDAZOLINE III

It was prepared in glass-lined equipment in a nitrogen atmosphere involving three steps wherein vigorous agitation of the reactants was maintained in each step. In the first step, two moles of each of oleic acid and triethylene tetramine were reacted for 4 hours at 150° C. to 220° C. and a pressure of 150 to 50 mm. Hg. In the second step, azelaic acid and diethylene glycol were reacted separately in a molar ratio of 2.4:1.8 for 6 hours at 125° C. to 200° C. and a pressure of 760 to 25 mm. Hg. The final product was obtained in step 3 which involved reacting 3.5 parts by weight of the reaction product of step 1 and 2.8 parts by weight of the reaction product of step 2. Step 3 was carried out at 140° C. to 240° C. and a constant pressure of 20 mm. Hg over a 4-hour period. The distillate was collected in a trap and recovered. The total distillate corresponded with substantially complete reaction, giving a product having the following predominant structure:

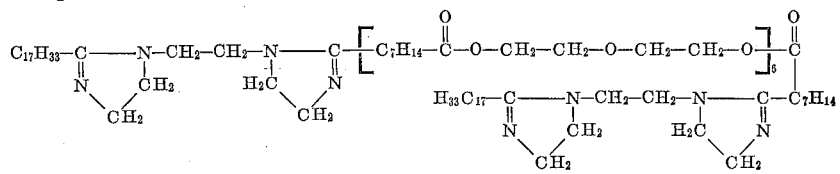

POLYIMIDAZOLINE IV

This compound is identified as 2,2'-octamethylene-di-2-imidazoline and has the following structure:

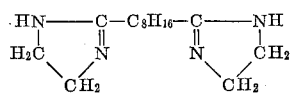

Example 1

100 grams of air-floated Wyoming bentonite were dried in a forced draft air oven for ½ hour at 200° C. The product lost 6 percent of its weight to yield 94 grams.

40 grams of pre-dried bentonite were dispersed in 250 grams of methylene chloride containing 10 grams of Polyimidazoline I. After the components were thoroughly dispersed, the methylene chloride was evaporated in a pan at 100° C. The resulting polyimidazoline-bentonite complex was recovered as a dry powder.

Example 2

This example shows the comparative results of two polymeric compositions in which one contained a portion of the polyimidazoline-bentonite complex of Example 1 and the other had only a polyimidazoline substituted for the complex. Both compositions contained a conventional plasticizer.

| | Formulation (parts by weight) | |
|---|---|---|
| | A | B |
| Complex product of Example 1 | 2 | |
| Geon 121 (paste grade polyvinyl chloride) | 2 | 2. |
| Polyimidazoline I | | .4. |
| Dioctyl phthalate | 2 | 2. |
| Initial viscosity at 25° C., cps | 25,000 | 5,000. |
| Viscosity after one week at 25° C., cps | 25,000 | 40,000. |

2 MINUTE CURE at 200° C.

| | | |
|---|---|---|
| Color | Light brown | Dark brown. |
| Odor | Very slight | Strong. |
| Percent extract in 5% acetic acid | 2.1 | 10. |

4 MINUTE CURE at 200° C.

| | | |
|---|---|---|
| Color | Dark brown | Black. |
| Odor | Very slight | Strong, acrid. |
| Percent extract in 5% acetic acid | 1.8 | 12. |

It is noted that formulation A, which contained the polyimidazoline-bentonite complex, gave better viscosity stability and color over that of formulation B. In addition, the difference in the odor factor is significant. The black color of formulation B at the 4-minute cure time indicates degradation of the polymer.

*Example 3*

The simplest procedure and the one yielding the most satisfactory product is to disperse a high molecular weight polyimidazoline on the clay in a high-shear mixer using a plasticizer as a dispersing medium. In this respect, epoxidized triglycerides of vegetable oil fatty acids serve admirably as plasticizers. A representative formulation is as follows:

Parts by weight
Polyimidazoline II _____ 12.5
Pre-dried bentonite _____ 37.5
Epoxidized soybean oil _____ 50.0

25 parts of the epoxidized oil were first mixed with 12.5 parts of the dried bentonite in a Baker-Perkins mixer and heated to 100° C. to fluidize the mixture. Thereafter, 12.5 parts of the polyimidazoline were added and the mixture was agitated until a mutual precipitation reaction between the polyimidazoline and bentonite appeared. When this stage was reached, the remaining 25 parts of bentonite were added slowly, forming a very thick paste. At this point the high shear mixer produced a desirable degree of dispersion. Finally, an additional 25 parts of epoxidized soybean oil were added to give a gray thixotropic mud having a particle size of about .5 to 1 micron.

The effectiveness of the product of Example 3 when compounded with polymeric materials is reflected in Example 4.

*Example 4*

50 parts by weight of the product of Example 3 were thoroughly blended with 25 parts by weight of paste grade polyvinyl chloride (Geon 121). The properties of this composition are reported as follows.

Initial viscosity at 43° C., cps. _____ 10,000.
Viscosity after 1 year at 43° C., cps. _____ 12,000.
2 minute cure at 204° C.
Odor _____ Very slight.
Percent extract after 3 weeks at 60° C.:
  In water _____ .12.
  In 5% acetic acid _____ .63.
Percent nitrogen in extract (Kjeldahl method):
  In water _____ .11.
  In 5% acetic acid _____ .31.
Swelling value in cyclohexanone (reported in multiples equal to the original weight of the vulcanized composition) _____ 2 to 7.
Oxygen permeability constant _____ .5.

These results show that a vulcanized polyvinyl chloride composition is obtained as indicated by a swell rather than complete solution in cyclohexanone. The cured polymer had very low odor and extraction in aqueous systems and had a lower oxygen permeability than any flexible material applied from a 100 percent solids fluid state. The corresponding premeability value for an unvulcanized vinyl composition of the same hardness is 10.0, or 20 times higher than the value shown above. These polymers are particularly suitable as process resistant gaskets when used in contact with edible products. The percent extract corresponds to less than .1 p.p.m. of polyimidazoline in 100 grams of food exposed to 1 gram of gasket material. Without the bentonite, the extract corresponds to 30 p.p.m. of polyimidazoline and the odor is considerably stronger.

*Example 5*

The following ingredients were mixed using the same procedure described in Example 3:

Parts by weight
Poylimidazoline II _____ 12.5
Pre-dried bentonite _____ 37.5
Dioctyl adipate _____ 50

The resulting "mud" was much lower in viscosity than the corresponding mixture of Example 3 which was made with epoxidized soybean oil. It was then mixed with 10 parts by weight of zinc oxide powder. This product (110 parts by weight) was then compounded with 55 parts by weight of Geon 121. The properties of the polymeric composition were as follows:

Viscosity at 25° C., cps. ____ 1500.
Curing conditions _____ 1 minute at 202° C.
Odor _____ Slight odor of octyl alcohol.
Time to degrade at 202° C. _ 40 minutes.

This composition had an unusual set of properties, i.e., low viscosity, rapid vulcanization, and possessed a long time interval between vulcanization and degradation. This is due to the combined regulatory action of the bentonite and zinc oxide on the polyimidazoline cure of polyvinyl chloride. The composition is useful as a flowed-in gasketing material for aerosol cans which contain strong solvents.

*Example 6*

100 parts by weight of the product of Example 3 were mixed with 10 parts by weight of zinc oxide powder until a smooth mixture was obtained. The mixture (100 parts by weight) was then compounded with 55 parts by weight of Geon 121. The resulting composition had the following properties:

Viscosity at 24° C., cps. __ 22,000.
Cure conditions _____ 1 to 2 minutes at 199° C.
Time to degrade _____ 80 minutes.
Odor _____ Very slight.
Adhesion _____ Excellent to steel, aluminum, tinplate, glass, and many organic finishes, such as phenolic lacquers, epoxy lacquers, and oleoresinous varnishes.

It is noted that while the polymer cured rapidly, it had a long life at 199° C. before degradation set in. The inhibition to degradation over this period of time is due to the combination with zinc oxide. Degradation is generally evidenced by stiffening, blackening and loss of adhesion. The properties of the polymer make it useful as an industrial, heat-cured adhesive.

*Example 7*

| | Formulation (parts by weight) | | |
|---|---|---|---|
| | A | B | C |
| Product of Example 3 | 10 | 25 | 0 |
| Extrusion grade polyvinyl chloride | 100 | 100 | 100 |
| Filler (mixture of CaSiO₃ and CaCO₃) | 15 | 5 | 15 |
| Dioctyl phthalate | 15 | 5 | 0 |
| Zinc oxide | 10 | 10 | 0 |
| Stabilizer (barium-cadmium laurate) | 0 | 0 | 2.5 |

The powdery mixtures were milled into sheets at 121° C. and then cured in a mold at 177° C. for 45 minutes to attain maximum cross-linking. The properties of these mixtures are tabulated below. Formulation "C" approximates a standard rigid polyvinyl chloride pipe composiiton.

| | Formulation | | |
|---|---|---|---|
| | A | B | C |
| Tensile strength at 24° C., p.s.i | 7,800 | 7,200 | 7,800 |
| Properties at 93° C.: | | | |
| Tensile, p.s.i | 1,030 | 1,580 | 810 |
| Elongation, percent | 255 | 295 | 280 |
| Modulus, p.s.i | 520 | 630 | 329 |
| Properties at 93° C. after boiling in water for 24 hrs.: | | | |
| Tensile, p.s.i | 1,370 | 1,450 | 775 |
| Elongation, percent | 370 | 300 | 215 |
| Modulus, p.s.i | 301 | 500 | 211 |
| Effect of cyclohexanone | Swells | Swells | Dissolves |

Formulations "A" and "B" had equivalent tensile strength at room temperature compared to the straight polyvinyl chloride (formulation "C") even though the latter contained no plasticizer while "A" and "B" had 20 percent plasticizer on the polyvinyl chloride. At 93° C. (dry), the cured bentonite-polyimidiazoline compositions had almost double the tensile strength of the uncured product, a higher modulus and the same elongation values. The differences are even more striking after boiling for 24 hours. Moreover, the product of formulation "A" can be heated for long periods above the softening point of the polyvinyl chloride without melting or degrading due to the low concentration of the efficient polyimidazoline curing agent, epoxy plasticizer and zinc oxide. Formulations "A" and "B" are useful as non-thermoplastic vinyl pipe compositions.

*Example 8*

A polymeric composition was formulated by admixing 100 parts by weight of Vinylite VYNV (a copolymer comprising 93 to 95 percent vinyl chloride and 7 to 5 percent vinyl acetate), 100 parts by weight of the powdered product of Example 1, and 50 parts by weight of tributyl acetyl citrate. This composition had the following properties:

Initial viscosity at 24° C., cps. ____ 100,000.
Viscosity after 2 weeks at 24° C., cps. ____ 170,000.

Baked 2 minutes at 199° C.

Soluble in cyclohexanone ____ No.
Color ____ Tan.
Odor ____ Slight odor of plasticizer.
Percent extract in 5% acetic acid __ 0.42.
Adhesion to aluminum ____ Fair.

Baked 4 minutes at 199° C.

Soluble in cyclohexanone ____ No.
Color ____ Red-brown.
Odor ____ Very slight.
Percent extract in 5% acetic acid __ 0.32.
Adhesion to aluminum ____ Good.

The addition of the polyimidazoline-bentonite complex to a vinyl chloride copolymer imparts properties which are similar to those obtained by addition to straight polyvinyl chloride. These include low acid extraction coupled with desirable curing effects. The lower melting point of the vinyl acetate-vinyl chloride copolymer makes the composition of this example useful as a vulcanizable flowed-in gasket for foods where curing is carred out at temperatures of less than 163° C.

*Example 9*

The following ingredients were stirred together to give an organosol of low viscosity and suitable for spraying as a protective coating for steel:

| | Parts by weight |
|---|---|
| Product of Example 3 | 100 |
| Geon 121 | 100 |
| Zinc chromate ("Zinc Yellow") | 50 |
| Toluene | 100 |

This formulation had the following properties:

Baking conditions ____ 30 minutes at 160° C.
Film thickness ____ .5 to 1 mil.
Adhesion to mild steel ____ Excellent.
Effect of immersion in water for 24 hrs. ____ None.
Effect of residing in salt spray chamber for 250 hrs. at 35° C. ____ None. No corrosion, lifting or blistering.

In comparison, a conventional alkyd coating peeled, blistered and gave underfilm corrosion after subjection to the above salt spray test.

*Example 10*

Three formulations were prepared consisting of the following ingredients. Formulation "B" was identical with "A" except for the absence of bentonite clay. Formulation "C" shows the relative effect of zinc oxide and the zinc chromate of "A."

| | Formulation (parts by weight) | | |
|---|---|---|---|
| | A | B | C |
| Product of Example 3 | 100 | | 100 |
| Opalon 410 (paste grade polyvinyl chloride) | 50 | 50 | 50 |
| Zinc chromate | 40 | 40 | |
| Calcium oxide | 5 | 5 | 5 |
| Epoxidized soybean oil | 13 | 63 | 13 |
| Polyimidazoline II | | 12.5 | |
| Zinc oxide | | | 40 |

The properties of each formulation are tabulated as follows:

|  | A | B | C |
|---|---|---|---|
| Viscosity at 250° C., cps | 50,000 | 50,000 | 50,000 |
| Time to vulcanize at 199° C., minutes | 2 | 2 | 2 |
| Time to degrade at 199° C., minutes | 80 | 20 | 80 |
| Peel strength on aluminum, dry, lbs | 35 | 35 | 35 |
| Peel strength on aluminum after immersion in water for 4 weeks, lbs | 24 | 0 | 10 |

These results show that the incorporation of the polyimidazoline-bentonite complex in the polymer not only prolongs service life at elevated temperatures but it also greatly enhances the water resistance of adhesives made from polyimidazoline-cured polyvinyl chloride compositions. It is noted that zinc chromate is essential for water resistance, but without the bentonite (formulation "B") there is no bond left after immersion in water for one month. It is believed that this is due to the chemisorption of the water-soluble polyimidazoline by the clay which prevents water from dissolving polyimidazoline at the interface to loosen bonds that are formed.

Example 11

In this example, a pure crystalline diimidazoline (polyimidazoline IV) was employed. It has a melting point of 187° C. and is essentially incompatible with polyvinyl chloride or any plasticizer for it. On incorporation of Polyimidazoline IV in a simple polyvinyl chloride mixture only islands of cure are obtained on heating. This defect was overcome by preparing the following mixture:

| | Parts by weight |
|---|---|
| Polyimidazoline IV | 10 |
| Pre-dried bentonite | 30 |
| Methanol | 40 |

The mixture was heated at about 50° C. to dissolve the polyimidazoline and the solvent was driven off by heat to give a powdery polyimidazoline-bentonite complex. 10 parts of the complex were then formulated with 25 parts of dioctyl phthalate and 25 parts of Geon 121, all parts being expressions of weight. This formulation had the following properties:

| | |
|---|---|
| Curing conditions | 1 minute at 199° C. |
| Color | Uniform light brown. |
| Odor | Very slight trace of plasticizer. |
| Extraction in 5% acetic acid | 2 percent. |

The use of the pure polyimidazoline demonstrates the effectiveness of the bentonite reaction product with an otherwise incompatible, crystalline chemical.

Example 12

The formulations of this example show the effect of increasing amounts of bentonite in a rubber-like polyvinyl chloride composition cross-linked with a polyester-containing polyimidazoline.

| | Formulation (parts by weight) | | | |
|---|---|---|---|---|
| | A | B | C | D |
| Polyimidazoline III | 20 | 20 | 20 | 20 |
| Pre-dried bentonite | 0 | 10 | 15 | 20 |
| Geon 121 | 40 | 40 | 40 | 40 |
| Epoxidized soybean oil | 20 | 20 | 20 | 20 |

Properties of each formulation when cured for 6 minutes at 199° C. were as follows:

| | A | B | C | D |
|---|---|---|---|---|
| Color | Dark brown | Brown | Light brown | Light brown. |
| Odor | Moderate | Slight | Very slight | None. |
| Percent extract in 5% acetic acid | 8 | 4 | 2 | 0. |
| Taste level of extract | Strong | Strong | Moderate | Slight. |
| Swelling value in cyclohexanone (reported in multiples equal to the original weight of the vulcanized composition) | 3.5 | 3.5 | 3.5 | 3.5. |

While about 70 percent of the polyimidazoline-polyester is normally grafted to the polyvinyl chloride on cure, the remaining material is generally extractable and precludes the use of these soft unvulcanized products as flowed-in gaskets for food products. The products of formulations "A" through "D" show that this defect can be overcome by the increased bentonite content. "D" corresponds almost exactly with the amount of bentonite required to react fully with the polyimidazoline as calculated from the base exchange capacity of the clay and the equivalent weight of the polyimidazoline.

Example 13

| | Parts by weight |
|---|---|
| Polyimidazoline II | 1 |
| Pre-dried bentonite | 3 |
| Epoxidized 2-ethylhexyl tallate | 4 |

The polyimidazoline was mixed with 1 part of the epoxidized ester and 1 part of the bentonite and heated to 100° C. Then the remaining 2 parts of bentonite and 3 parts of epoxidized ester were added. Mixing was carried out in a high shear mixer to assure good dispersion. The product was a low viscosity, thixotropic fluid and when compounded with paste grade polyvinyl chloride it gave cross-linked, heat stable, low odor plastisols.

Example 14

| | Parts by weight |
|---|---|
| Polyimidazoline I | 1 |
| Pre-dried bentonite | 3 |
| Acetylated epoxidized castor oil | 4 |

The ingredients were blended in the same manner as described in Example 13. The product when compounded with polyvinyl chloride gave a plastisol which had unusual viscosity stability and when cured it exhibited excellent adhesive properties.

Example 15

| | Parts by weight |
|---|---|
| Polyimidazoline II | 1 |
| Pre-dried bentonite | 3 |
| Dioctyl phthalate | 4 |
| Zinc oxide | 1 |

The polyimidazoline was mixed with 1 part of the bentonite and 1 part of dioctyl phthalate and heated to 100° C. The mixture was agitated in a Baker-Perkins mixer to give high shear and then the remaining amounts of clay and plasticizer were added slowly to give a smooth dispesion. The mixture was cooled to 30° C. at which time the zinc oxide was added. The product was a gray-white paste which when blended with paste grade and extrusion grade polyvinyl chloride gave cross-linkable compositions of exceptionally low odor and heat stability. Aqueous extraction of these compositions was less than 1 percent.

Example 16

| | Parts by weight |
|---|---|
| Polyimidazoline I | 1 |
| Pre-dried bentonite | 1 |
| Dioctyl phthalate | 2 |
| Lead oxide (Pb$_3$O$_4$) | 1 |

The four ingredients were blended in a high speed mixer until smooth and then heated to about 100° C. for about ½ hour and cooled. The product appeared as a bright red, medium viscosity fluid. When compounded with polyvinyl chloride, it had a very rapid cross-linking action characterized by a marked "plateau," i.e., cross-linking occured in 2 to 3 minutes at 199° C. but no degradation occurred when heating was continued at this temperature for several hours.

Example 17

| | Parts by weight |
|---|---|
| Polyimidazoline I | 1 |
| Pre-dried bentonite clay | 3 |
| Tricresyl phosphate | 3 |

The ingredients were stirred together at room temperature to give a readily pourable thixotropic fluid. When mixed with paste grade polyvinyl chloride or blended with extrusion grade polyvinyl chloride, the cured products exhibited better adhesion compared to polyvinyl chloride compositions cured with unmodified basic nitrogen materials.

Examples 18 and 19 show that the product derived from the reaction of undried bentonite clay and a polyimidazoline can be as equally effective in curing halogenated polymers as the product obtained by using pre-dried bentonite provided that the surface water of the clay is driven off prior to compounding with the halogenated polymer. This is easily carried out by heating the undried clay-polyimidazoline mixture at an appropriate temperature until no more water ditsills off.

Example 18

| | Parts by weight |
|---|---|
| Polyimidazoline II | 1 |
| Undried bentonite clay (contained 7% moisture) | 3 |
| Methylene chloride | 4 |

The ingredients were blended in a mixer, yielding a very dilatant slurry. The solvent was evaporated in a shallow pan at 60° C. to give a polyimidazoline-bentonite powder. 4 parts by weight of this powder were incorporated with 4 parts by weight of tributyl acetyl citrate as plasticizer and the mixture was heated to 100° C. in vacuo. Heating was carried out under these conditions until such time as no more water distilled off. The resulting product was a low viscosity, gray fluid suitable for nozzle application as a food cap gasket.

100 parts by weight of the product of Example 18 were mixed with 50 parts by weight of Geon 121. When cured at 149° C. in a press, it had the following properties:

| Cure Time, minutes | Color | Swelling value in cyclohexanone |
|---|---|---|
| 1 | Tan | 10 |
| 2 | Brown | 2 |

Example 19

| | Formulation (parts by weight) | | | | |
|---|---|---|---|---|---|
| | A | B | C | D | E |
| Polyimidazoline I | 1 | 2 | 3 | 6 | 12 |
| Undried bentonite clay (contained about 7 percent moisture) | 12 | 12 | 12 | 12 | 12 |
| Methylene chloride | 100 | 100 | 100 | 100 | 100 |

Each formulation was agitated and then dried at 130° C. for 1 hour to remove the solvent and the water adsorbed on the clay. This treatment gave the following products.

| Formulation: | Physical form of product |
|---|---|
| A | Dry powder. |
| B | Dry powder. |
| C | Dry powder. |
| D | Slightly tacky powder. |
| E | Tacky solid. |

From these results, it appears that the clay was able to react with half its weight of Polyimidazoline I. This corresponds with twice its base-exchange capacity of 80 milliequivalents per 80 grams of dried clay but corresponds well with published data showing that sodium bentonite can adsorb twice the amount of an amine that is theoretically exchanged via physical adsorption. Beyond this value, the inherently sticky nature of Polyimidazoline I becomes evident.

An extraordinary property of the products of "A," "B" and "C" is the complete lack of reactivity with both conventional epoxy resins and isocyanate prepolymers. Polyimidazoline I by itself is an excellent curing agent for these reactive materials, but the dried bentonite addition products can be heated to 200° C. with Epon 828 (condensation polymer of epichlorohydrin and bisphenol A) and Adiprene L (a synthetic rubber consisting of the reaction product of a diisocyanate and polyalkylene ether glycol) without curing these resins. On the other hand, the products of formulations "A," "B" and "C" cause rapid cross-linking of polymers and copolymers of vinyl chloride, vinylidene chloride copolymers, and other halogenated polymers. A specific example of the latter use is as follows:

| | Parts by weight |
|---|---|
| Formulation A | 10 |
| Methyl ethyl ketone | 50 |
| Saran F220 (a copolymer comprising about 80 percent vinylidene chloride and 20 percent acrylonitrile) | 20 |
| Zinc chromate | 10 |

After evaporation of the solvent, the product cross-linked to give an insoluble adhesive material useful in laminates.

Example 20 shows the effect of adding pre-dried bentonite to a vinyl chloride copolymer. It also demonstrates that the bentonite and the polyimidazoline can be added separately to the copolymer and still gain desirable results.

Example 20

| | Formulation (parts by weight) | |
|---|---|---|
| | A | B |
| Vinylite VYLF (a copolymer comprising about 13 percent vinyl acetate and 87 percent vinyl chloride) | 10 | 10 |
| Methyl ethyl ketone | 20 | 20 |
| Dried bentonite | 3 | |
| Polyimidazoline II | 1 | 1 |
| Zinc chromate | 2 | 2 |

The constituents were mixed in the solvent, giving a solution of the copolymer and polyimidazoline, the other ingredients being in suspension. Samples of each formulation were applied to mild steel panels in amounts of 1 mil thickness and baked. The results were as follows:

| Formulation | Curing conditions | | Color | Adhesion | | Corrosion |
|---|---|---|---|---|---|---|
| | Temp., °C. | Time, minutes | | Dry | 1 Week in H₂O | |
| A | 160 | 10 | Tan-yellow | Excellent | Excellent | None. |
| B | 160 | 10 | Tan | ----do---- | Poor | Slight. |
| A | 200 | 1 | Tan-yellow | ----do---- | Excellent | None. |
| B | 200 | 1 | Brown | ----do---- | Poor | Slight. |

A comparison of the results of formulations "A" and "B" shows that the presence of dried bentonite in "A" has a profound effect on the water resistance of the cured polymer and also on its heat stability.

Example 21

| | Parts by weight |
|---|---|
| Geon 121 | 50 |
| Dioctyl phthalate | 50 |
| Dried bentonite | 10 |
| Polyimidazoline I | 3 |
| Mercuric oxide | 5 |

This formulation was cured at 199° C. for various time periods, giving the following results:

| Cure time (minutes) | Color | Properties |
|---|---|---|
| 2 | Reddish | Soft, vulcanized. |
| 10 | Reddish | Do. |
| 20 | Brown | Do. |
| 30 | Dark brown. | Do. |

Here, the combination of bentonite and metal oxide leads to a very stable polymer at high temperature and prolonged curing periods.

Example 22 compares the effect of adding dried and undried bentonite to polyvinyl chloride.

Example 22

A quantity of bentonite was dried for ½ hour at 200° C. resulting in a loss of 5 percent by weight. 100 parts by weight of Polyimidazoline III were heated to 100° C. and then 100 parts of the dried bentonite were added thereto with stirring. The temperature was held at about 100° C. for about 5 minutes and then cooled rapidly. The product was a heavy green-gray mud and is labeled here as formulation "A." Formulation "B" was prepared and consisted simply of 100 parts by weight of Polyimidazoline III and 100 parts by weight of undried bentonite. 2 parts by weight of each formulation were then compounded with 1 part by weight of Geon 121 and cured for 2 and 4 minutes at 200° C. The results were as follows:

| Formulation | 2-Minute Cure | | 4-Minute Cure | |
|---|---|---|---|---|
| | Crosslinking | Color | Crosslinking | Color |
| A | Yes | Tan | Yes | Light brown. |
| B | No | Light tan | Very slight | Light tan. |

It is noted that the presence of dried bentonite clay in formulation "A" caused a cross-linking action of the polyimidazoline at both the 2- and 4-minute curing levels. Undried bentonite on the other hand, was ineffective in this respect.

The foregoing description and examples illustrate the effectiveness of the dried bentonite-polyimidazoline combination in curing halogenated polymers. When a polyimidazoline and dried bentonite clay are dispersed in a plasticizer such as epoxidized soybean oil, and powdered polyvinyl chloride is added, a rapid-heat curable mix is obtained. The materials can be readily combined to give a fluid 100 percent mix capable of being deposited as a gasketing material in a food jar cap. The cross-linking reaction with polyimidazolines and epoxy plasticizers allows such jars to pass through high temperature processing without loss of seal or loss of adhesion of gasket.

Prolonged treatment in water or vinegar yields low extraction of nitrogenous material. Odor level is equal to that of conventional vinyl plastic used in contact with food. Furthermore, the oxygen permeability is reduced tenfold during the cross-linking reaction. It is believed that these favorable effects are due to the interaction of bentonite clay and polyimidazoline in the presence of the halogenated polymer.

The proportions of the components in the polyimidazoline-bentonite complex and the final polymeric composition may vary over wide limits depending upon the type of processing and properties desired. In addition, conventional additives may be incorporated such as fillers and dyes. In preparing certain complexes, the following limits generally apply. These complexes are identified as (A), (B), and (C) for the sake of simplicity.

| Complex | Component | Limits (percent by weight) | |
|---|---|---|---|
| | | Broad | Preferred |
| A | Polyimidazoline | 5–50 | 20–40 |
| | Dried bentonite | 95–50 | 80–60 |
| B | Polyimidazoline | 5–50 | 20–40 |
| | Dried bentonite | 25–50 | 30–40 |
| | Plasticizer | 20–60 | 30–40 |
| C | Polyimidazoline | 5–50 | 20–40 |
| | Dried bentonite | 25–50 | 30–40 |
| | Plasticizer | 20–60 | 30–40 |
| | Metal oxide | .5–30 | 1–20 |

The polymeric compositions may contain between about 10 percent to 95 percent by weight of halogenated polymer based on the weight of the total mixture, preferably 20 percent to 90 percent. Liquid plastisol compositions have a maximum polyvinyl chloride content of about 65 percent. The polyimidazoline-bentonite complex may be present in amounts ranging between about 5 percent to 50 percent based on the weight of the polymeric composition, the remainder of the composition being constituted of plasticizer, metal oxide and filler. Liquid compositions should not contain more than 40 percent bentonite, else the viscosity becomes much too high for application. The total imidazoline content may vary from .5 percent to 25 percent depending on the cure conditions and the polyimidazoline structure. Curing of the polymeric compositions may be carried out at temperatures between about 150° C. to 250° C. for 30 seconds to 60 minutes.

We claim:

1. An agent for curing halogenated polymers comprising the reaction product of 50 to 95 percent by weight of dried bentonite and 5 to 50 percent by weight of a polyimidazoline selected from the group consisting of 2-substituted-2-imidazoline and 1,2-disubstituted-2-imidazoline.

2. The agent of claim 1 which additionally contains 20 to 60 percent by weight of a plasticizer for vinyl chloride homopolymer and copolymers of vinyl chloride with a monoethylenically unsaturated monomer.

3. The agent of claim 2 wherein the plasticizer is an epoxidized triglyceride of a vegetable oil fatty acid.

4. The agent of claim 3 wherein the plasticizer is epoxidized soybean oil.

5. The agent of claim 1 which additionally contains 0.5 to 30 percent by weight of a metallic compound which is capable of forming ammonia complexes and is a compound of a metal selected from the group consisting of zinc, cadmium, mercury and lead.

6. The agent of claim 5 which additionally contains 20 to 60 percent by weight of a plasticizer for vinyl chloride homopolymer and copolymers of vinyl chloride with a monoethylenically unsaturated monomer.

7. The agent of claim 1 wherein the polyimidazoline is derived by reacting one mole of sebacic acid, two moles of oleic acid and two moles of triethylene tetramine at a temperature of 150° C. to 220° C. and a pressure of 760 to 15 mm. Hg in a nitrogen atmosphere for a 4-hour period.

8. The agent of claim 1 wherein the polyimidazoline is derived by reacting two moles of oleic acid, five moles of sebacic acid and six moles of triethylene tetramine at a temperature of 150° C. to 200° C. and a pressure of 760 to 15 mm. Hg in a nitrogen atmosphere for 4 hours.

9. The agent of claim 1 wherein the polyimidazoline is derived by (1) first reacting two moles of oleic acid and two moles of triethylene tetramine for 4 hours at 150° C. to 220° C. and a pressure of 150 to 50 mm. Hg, (2) then reacting 2.4 moles of azelaic acid and 1.8 moles of diethylene glycol for 6 hours at 125° C. to 200° C. and a pressure of 760 to 25 mm. Hg, and (3) finally reacting 3.5 parts by weight of the reaction product of step (1) and 2.8 parts by weight of the reaction product of step (2) for a 4-hour period at 140° C. to 240° C. and a constant pressure of 20 mm. Hg, each of said reaction steps being carried out in a nitrogen atmosphere.

10. The agent of claim 1 wherein the polyimidazoline is 2,2′-octamethylene-di-2-imidazoline.

11. An agent for curing halogenated polymers which comprises 1 part by weight of a polyimidazoline selected from the group consisting of 2-substituted-2-imidazoline and 1,2-disubstituted-2-imidazoline, 3 parts by weight of dried bentonite and 4 parts by weight of an epoxidized triglyceride of vegetable oil fatty acid.

12. The agent of claim 11 wherein the epoxidized triglyceride is epoxidized soybean oil.

13. The agent of claim 12 which additionally contains 1 to 4 parts of a zinc compound which is capable of forming ammonia complexes.

14. A curable composition which comprises a vinyl halide polymer and 5 to 50 percent based on the weight of the halogenated polymer of the agent of claim 1.

15. The composition of claim 14 wherein the halogenated polymer is selected from the group consisting of vinyl chloride homopolymer and copolymers of vinyl chloride with a monoethylenically unsaturated monomer.

16. A curable composition which comprises polyvinyl chloride and 5 to 50 percent based on the weight of the polyvinyl chloride of the agent of claim 2.

17. A curable composition which comprises polyvinyl chloride and 5 to 50 percent based on the weight of the polyvinyl chloride of the agent of claim 11.

18. A curable composition which comprises polyvinyl chloride and 5 to 50 percent based on the weight of the polyvinyl chloride of the agent of claim 12.

19. A curable composition which comprises polyvinyl chloride and 5 to 50 percent based on weight of the polyvinyl chloride of the agent of claim 13.

20. A curable composition which comprises 1.25 to 12.5 parts by weight of an imidazoline selected from the group consisting of 2-substituted-2-imidazoline and 1,2-disubstituted-2-imidazoline, 3.75 to 37.5 parts by weight of dried bentonite, 5 to 50 parts by weight of epoxidized soybean oil and 25 to 100 parts by weight of a halogenated polymer selected from the group consisting of polyvinyl chloride and a vinyl chloride-vinyl acetate copolymer.

21. The composition of claim 20 which is supplemented by the addition of 1 to 4 parts by weight of a zinc compound which is capable of forming ammonia complexes.

22. The polymer derived by heating the composition of claim 15 for 30 seconds to 60 minutes at 150° C. to 250° C.

23. The polymer derived by heating the composition of claim 18 for 1 to 45 minutes at 170° C. to 200° C.

References Cited by the Examiner

UNITED STATES PATENTS

| | | | |
|---|---|---|---|
| 2,426,586 | 9/1947 | Beber | 260—299 |
| 2,634,244 | 4/1953 | Simon et al. | 260—2.5 |
| 2,753,314 | 7/1956 | Severs et al. | 260—23 |
| 2,779,743 | 1/1957 | Schwenke | 260—23 |
| 2,881,178 | 4/1959 | Hogsett | 260—299 |
| 3,017,379 | 1/1962 | Feild | 260—30.6 |
| 3,050,528 | 8/1962 | Dearborn et al. | 260—23 |
| 3,053,788 | 9/1962 | Blackman et al. | 260—309.6 |
| 3,147,705 | 9/1964 | Broderick et al. | 260—23 |

DONALD E. CZAJA, *Primary Examiner.*

MILTON STERMAN, LEON J. BERCOVITZ,
*Examiners.*